(12) United States Patent
Nandy et al.

(10) Patent No.: US 12,549,402 B2
(45) Date of Patent: Feb. 10, 2026

(54) MULTICAST FOR MULTIFABRIC VIRTUALIZED NETWORKS

(71) Applicant: HEWLETT PACKARD ENTERPRISE DEVELOPMENT LP, Spring, TX (US)

(72) Inventors: Tathagata Nandy, Bangalore (IN); Thomas Samuel, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 71 days.

(21) Appl. No.: 18/754,568

(22) Filed: Jun. 26, 2024

(65) Prior Publication Data

US 2025/0337609 A1 Oct. 30, 2025

(30) Foreign Application Priority Data

Apr. 30, 2024 (IN) .............................. 202441034177

(51) Int. Cl.
*H04L 12/18* (2006.01)
*H04L 12/46* (2006.01)

(52) U.S. Cl.
CPC ........ *H04L 12/185* (2013.01); *H04L 12/1881* (2013.01); *H04L 12/4633* (2013.01)

(58) Field of Classification Search
None
See application file for complete search history.

(56) References Cited

U.S. PATENT DOCUMENTS

| | | | |
|---|---|---|---|
| 10,728,137 B1* | 7/2020 | Chakraborty | H04L 45/16 |
| 10,958,564 B1* | 3/2021 | Asthana | H04L 45/20 |
| 2013/0077628 A1* | 3/2013 | Appalla | H04L 45/16 370/390 |
| 2014/0369345 A1* | 12/2014 | Yang | H04L 12/1886 370/392 |
| 2016/0277199 A1* | 9/2016 | Nagarajan | H04L 45/16 |
| 2016/0277463 A1* | 9/2016 | Nagarajan | H04L 45/026 |
| 2021/0099379 A1* | 4/2021 | Kaliyamoorthy | H04L 45/02 |
| 2021/0144019 A1* | 5/2021 | Kebler | H04L 12/185 |
| 2021/0194711 A1* | 6/2021 | Nagarajan | H04L 12/1886 |
| 2022/0417059 A1* | 12/2022 | Nalagatla | H04L 12/185 |
| 2023/0022760 A1* | 1/2023 | Nandy | H04L 12/4633 |
| 2023/0099633 A1* | 3/2023 | Nandy | H04L 45/64 370/390 |
| 2023/0254170 A1* | 8/2023 | Pattabhiraman | H04L 12/1886 370/390 |
| 2024/0348553 A1* | 10/2024 | Mishra | H04L 45/16 |
| 2025/0055721 A1* | 2/2025 | Khan | H04L 12/185 |

* cited by examiner

*Primary Examiner* — Phyllis A Book
(74) *Attorney, Agent, or Firm* — Slater Matsil, LLP

(57) ABSTRACT

In certain implementations, a border VTEP device sends, to a second border VTEP devices, a first PIM-SM hello message indicating the border VTEP device is a local RP in a first fabric of a VxLAN. The border VTEP device receives a second PIM-SM hello message indicating that the second border VTEP devices is a local RP in a second fabric. A first PIM-SM control message is sent to the second border VTEP device, indicating PIM-SM sources in the first fabric, including a first PIM-SM source. A second PIM-SM control message is received from the second border VTEP device indicating PIM-SM sources in the second fabric. A PIM-SM join message specifying the first PIM-SM source is received from a receiver DR for a PIM-SM receiver. A PIM-SM data stream is forwarded from a source DR to the receiver DR.

20 Claims, 6 Drawing Sheets

MULTICAST FOR MULTIFABRIC VIRTUALIZED NETWORKS

BACKGROUND

Virtualized networks have gained popularity for providing flexible network solutions that can be implemented on top of existing physical network infrastructure. Various different types of virtualized networks have been developed and used, such as software-defined networks, virtual local area networks (VLANs), and virtual extensible local area networks (VxLANs).

In one example, software defined networking (SDN) provides an overlay network on top of a physical network, with centralized management planes and data transmission planes. The overlay network potentially may be used in certain backbone networks. For more widespread commercial applications, a VLAN allows having a broadcast domain in an existing computer network that is partitioned and isolated from other hosts in the computer network. The architecture of VLAN may involve creating a virtual data link layer (e.g., layer 2 in the Open Systems Interconnection (OSI) network stack model) on top of an existing network layer (e.g., layer 3 in the OSI model). In this manner, VLAN also may create an overlay network that is a virtual network implemented on top of a physical network. With VLAN, the underlying physical network layer may be abstracted, or invisible, to operation of the VLAN. As a result, the underlying physical network layer can be changed, such as by reconfiguring nodes and paths in the network layer, with little, or no, effect on operation of any VLAN domains. VLAN is often referred to as an overlay encapsulation protocol but was limited to a 12-bit identifier (VLAN ID), or 4096 logical network domains, when first formally introduced in 1998 under the IEEE 802.1Q standard.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale, or perspective.

DESCRIPTION

Figure 1:
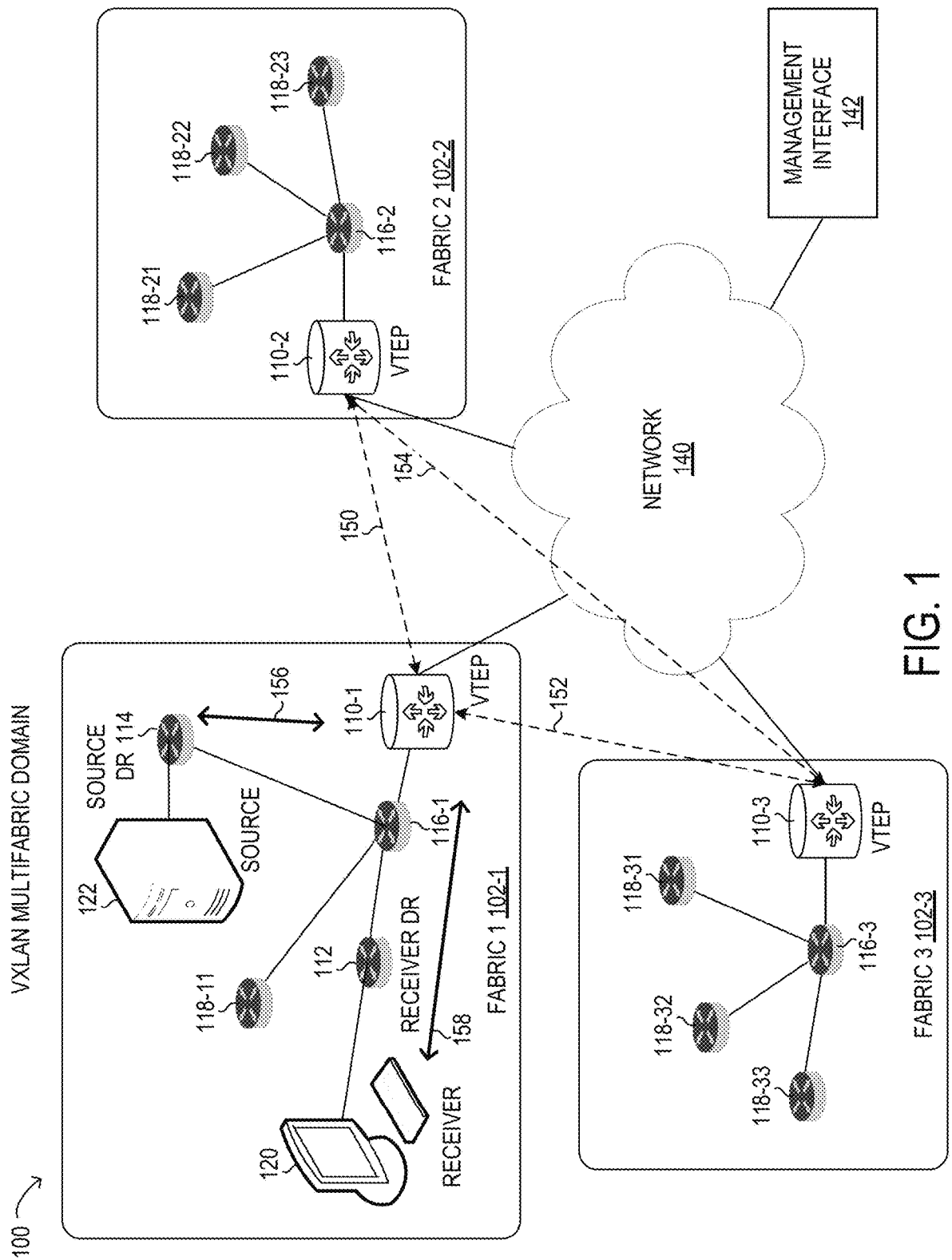
FIG. 1 is a depiction of a VxLAN multifabric domain, in an example.

The following disclosure provides different examples for implementing different features. Specific examples of components and arrangements are depicted for descriptive clarity in the present disclosure. The present disclosure provides examples that are not intended to be limiting implementations of the subject matter disclosed herein.

Throughout this disclosure, a hyphenated form of a reference numeral refers to a specific instance of an element and the un-hyphenated form of the reference numeral refers to the element generically, or collectively. Thus, as an example (not shown in the drawings), a device "12-1" would refer to an instance of a device class, which may be referred to collectively as devices "12" and any one of which may be referred to generically as a device "12."

In some implementations, a virtual extensible local area network (VxLAN) domain may include multiple local sites, or fabrics, referred to collectively as a multifabric. When a protocol independent multicasting sparse mode (PIM-SM) protocol is used within such a multifabric VxLAN, the standard PIM-SM protocol may be associated with certain undesired network traffic related to having one singular rendezvous point (RP) in the multifabric. For example, border virtual tunneling endpoint (VTEP) devices in the multifabric may use interfabric tunnels to communicate with the RP for the PIM-SM protocol, which may be undesirable.

According to certain implementations of this disclosure, a PIM-SM protocol over VxLAN can be optimized by having each border VTEP device serve as a local RP in a respective fabric of a VxLAN domain. The optimized PIM-SM protocol disclosed herein can also provide a low-overhead exchange of state information among the local RPs. As a result, certain PIM-SM messages can be transmitted within the respective fabric rather than being transmitted over interfabric tunnels, as described in further detail below, which is desirable for reducing network traffic and network loading. In the event of a failure associated with a local RP, the resulting scope of multicast outages, as compared to the standard PIM-SM protocol used in a VxLAN domain, can be reduced or mitigated in effect. Additionally, the optimized PIM-SM protocol disclosed herein can reduce PIM-SM synchronization overhead by combining information from multiple sources in a single message, among other advantages described in further detail herein.

With the advent of modern data centers and with the commoditization of more and more network services, leading to larger and different types of network providers in the marketplace, the 12-bit VLAN ID restriction for VLAN increasingly became a limiting constraint. Accordingly, the next generation of virtualized networks, VxLAN was developed and was formalized by the Internet Engineering Task Force (IETF) in the RFC 7348 standard published in 2014. VxLAN is similar to VLAN and is also an overlay encapsulation protocol. However, VxLAN overcomes the 12-bit VLAN ID constraint by providing a 24-bit identifier (VNID) that may allow up to at least 16 million logical network domains. Furthermore, VxLAN creates a virtual (or logical) data link layer (OSI layer 2) over an existing transport layer (OSI layer 4) in a physical network. Thus, VxLAN can encapsulate Ethernet frames (layer 2) back into UDP datagrams (layer 4) to create a virtual overlay broadcast domain on a physical network that supports the Internet protocol (IP).

Although usable in a variety of scenarios, VxLAN may be used by entities that have multiple facilities at different locations that are to be organized into one or more logical domains. The different VxLAN network segments at one or more different locations are referred to individually as a "VxLAN fabric," or simply a "fabric," and collectively referred to as "VxLAN multifabrics," or simply, "multifabrics."

One particular example application of virtualized networks such as VxLANs is the ability to stream data with head-end replication (HER), in which one or more sources can stream data to one or more receivers, and this data streaming may involve flooding the network with traffic from source(s) to receiver(s), such as in the form of IP packets. The data may be streamed from the one or more sources to the one or more receivers using broadcasting, unicasting, and/or multicasting, for example. The virtual overlay architecture of VxLAN may facilitate providing such streaming services (e.g., multicasting services) with little, or no, effect on other network nodes in the same physical network that are not included in the particular VxLAN, which may promote efficient use of network infrastructure.

One particular example implementation of multicasting is a type of routing protocol called protocol independent multicast (PIM) that can multicast (e.g., send a flood of network packets representing a data stream from a source to different destinations, or receivers). As used herein in the context of PIM, a "source" and a "receiver" can refer to network devices, such as user-operated devices that can generate data streams (e.g., a source), or consume data streams (e.g., a receiver). One example of a source is a network server configured as a media server that can support streaming connections to multiple clients, or receivers.

In general, PIM uses an underlying network topology to populate a routing table. The network topology used by network devices for PIM can be determined using various protocols, such as Internet group management protocol (IGMP) or multi-gateway multipath routing protocol (MGMP). The routing table is used for PIM to identify neighboring network devices along multicast paths to destination network devices. Thus, based on the routing table, receivers can send join messages to the neighboring network devices to begin receiving data streams for PIM. The data streams in PIM can then flow along a reverse path of the join messages Three main aspects of PIM include PIM dense mode (PIM-DM), PIM bi-directional mode, and PIM sparse mode (PIM-SM). The most current version of PIM is PIMv2 that is referenced herein and forms the basis of IETF RFC 7761 published in 2016 that specifies the PIM-SM protocol. PIM-SM may be used for streaming data flows having a low density of receivers for a given source. As used herein, the PIM-SM streaming data flows are referred to as "PIM-SM data streams". The PIM-SM data streams can be established and distributed over the network from sources to receivers absent direct knowledge of each other.

The routing information used for PIM-SM data streams may include a state element and a distribution tree. A state element may be defined by the so-called S-G, or (S, G), values, which represent a unicast source(S) and a multicast group (G). The unicast source value S defines a unicast IP address of a PIM-SM data stream source (e.g., a source), while the multicast group value G defines a multicast group IP address of the PIM-SM data stream for the unicast source(S), also referred to as a source-group pair. A PIM-SM distribution tree can represent a path in the network from the sender (or source) to the destination (or receiver) of a PIM-SM data stream. In certain implementations, the PIM-SM distribution tree may include two components that are relative to a RP: a shortest path tree (SPT) and a rendezvous point tree (RPT) (also referred to as a shared tree). The SPT can represent a shortest path from the source to the RP, while the RPT can represent a shortest path from the RP to the receiver. The SPT can define multiple sources and the RPT can define multiple receivers in various implementations.

For example in typical PIM-SM, one network device in a network domain can be configured as the RP, which can serve as an intermediary network device to manage communication between senders and receivers seeking to participate in PIM-SM data streams in the network domain, as explained further below. In certain implementations of PIM-SM in a VxLAN, one network device in a VxLAN domain is designated as the RP for the VxLAN domain, including the other fabrics in a multifabric VxLAN domain.

Specifically, the PIM-SM protocol defines a source of the PIM-SM data stream. The source can begin sending data destined for a PIM-SM group at any time. The sender DR can encapsulate the data into packets and forward them directly to the RP. The RP in the PIM-SM protocol can receive the encapsulated packets, decapsulate the packets, and forward the PIM-SM data stream to the one or more receivers using the RPT, based on state values (*,G) that indicate any source sending to a group G that each receiver has previously indicated in a PIM-SM join message to the RP. As a result, the packets of the PIM-SM data stream can be replicated at RPT branches in order to reach the one or more receivers for the group G. The action of forwarding the encapsulating packets from the source to the RP is called registering, while the encapsulated packets are referred to as PIM-SM register packets.

From the source, reverse path forwarding (RPF) can be used with the routing table used for PIM-SM to check a source identifier within the PIM-SM register packets for decapsulation by the RP. When the PIM-SM register packets are decoded as coming from the source identifier, the packet can proceed; otherwise the PIM-SM register packets may be dropped. Since a network topology of the forwarding network devices (e.g., routers, switches) from the source are generally known, RPF can also be used to identify loops, such as by identifying redundant network paths among network devices.

The RP acts as the intermediary for PIM-SM data streams by providing a defined point of contact for senders and receivers, through which the PIM-SM data stream can be forwarded to one or more receivers. Thus, receivers seeking to join a PIM-SM data stream from a source can communicate directly with the RP via the RPT, while the RP, in turn, can communicate with the source via the SPT. Furthermore, PIM-SM uses at least two designated network devices that can be configured as routers, referred to as a source designated router (DR), and at least one receiver DR. The source DR sends PIM-SM register messages on behalf of the PIM-SM source to the RP, while the receiver DR sends PIM-SM join messages on behalf of PIM-SM receivers to the RP, among other types of communication associated with PIM-SM.

As noted, PIM-SM may be used for streaming data flows having a low density of receivers for a given source. Therefore, PIM-SM works with the use of the RP as an intermediate proxy, as noted above, and does not forward multicast traffic until each receiver requests the data stream that the multicast traffic represents.

Accordingly, in the PIM-SM process, a source DR may seek to start a new PIM-SM data stream on behalf of a source, for example a media server acting as the source. The source DR may perform a group to RP lookup to find the identify (e.g., IP address) of the RP for a given group G. Then, the source DR may start unicasting IP packets (e.g., the PIM-SM data stream) that include the PIM-SM register messages to the RP, and those PIM-SM register messages may encapsulate the PIM-SM data stream and source and group information defined by the state element (S, G) values. By receiving the (S, G) values for one or more sources, the RP becomes aware of PIM-SM sources and identifiers G of source-group pairs. The (S,G) values may be used to forward PIM-SM data stream packets for group G from the RP if the packets originate from source S.

A receiver seeking to join the PIM-SM data stream can forward a PIM-SM join message using its direct neighboring network device, which may be the receiver DR. The PIM-SM join message could be, for example, an IGMP join message or an MGMP join message, among other types of join message associated with another type of IP protocol, depending on the implementation of the PIM-SM group. For PIM-SM in a VxLAN, each network device in the fabric of the receiver may be aware of the RP. A receiver DR may then forward the PIM-SM join message specifying the state element (*, G) to the RP as an indication that the receiver seeks to join the group G for any sources for the group G.

In response to the PIM-SM join message from the receiver DR, the RP may build the RPT from the receiver to the RP (or from the RP to the receiver). Then, the multicast traffic received by the RP from the source for group G (as specified in the PIM-SM join message) starts being forwarded to the receiver via RPT as PIM-SM data stream packets. The source may indicate the group G that receivers can specify in the PIM-SM join message. For example, receivers may lookup registered groups G at the RP and use the value for G in the PIM-SM join message. In this manner, receivers may join group G at the RP without having to know the identity of the sender in the PIM-SM protocol. It is noted that the initiation procedures in PIM-SM for the source and the receiver can begin in any order independent of each other.

Meanwhile the source may continue to send further PIM-SM register messages to the RP via the SPT in which the source DR is included. The RP may then send an (S, G) state-specific join (e.g., a second PIM-SM join message) to the source (e.g., the source DR) to begin receiving PIM-SM data stream packets that are not encapsulated, also referred to as 'native' packets for the PIM-SM protocol. The RP can then send a PIM-SM register stop message to the source DR via the SPT, which stops sending the PIM-SM register messages to the RP to transport the PIM-SM data stream, but may continue periodically sending the PIM-SM register messages or other messages indicating that the PIM-SM data stream is still active. The source DR sends subsequent PIM-SM data stream packets to the RP, which then forwards the PIM-SM data stream packets to the receiver DR, and then ultimately to the receiver using the RPT. Finally, where the SPT intersects with the RPT, for example, depending on network topology, the SPT and/or the RPT may be pruned to a shortest path tree between the sender and the receiver, also referred to as an SPT switchover.

In operation of a typical PIM-SM protocol, the sending of the PIM-SM register messages can involve significant network overhead that can be associated with certain adverse results, such as increased network traffic and latency, or instability, in establishing new receiver connections. In the PIM-SM protocol, even when the second PIM-SM join message sent by the RP removes some encapsulation overhead, some forwarding paths that are loops or that are suboptimal may still exist. As noted, the PIM-SM protocol has a mechanism for the SPT switchover that can migrate the RPT and/or the SPT to a shortest path tree between the sender DR and the receiver DR. Subsequently, a PIM-SM prune message may be sent from the source DR to the RP to remove the previous SPT.

Turning to VxLAN, in some implementations, a VxLAN domain may include multiple local sites referred to individually as "a VxLAN fabric", such as at different remote locations. Each fabric may also be internally referred to as an intrasite fabric, while the VxLAN domain can be collectively referred to as a multifabric. When the PIM-SM protocol is used within such a multifabric VxLAN, the standard PIM-SM protocol may be sufficient for nominal operation, but still may be associated with certain undesired network traffic to implement.

For example, when the RP is located at a different fabric than the source DR, certain PIM-SM register messages are initially sent between the source and the RP, such as by using interfabric tunnels. A location and identity of the RP for the PIM-SM protocol may be fixed within the VxLAN domain, such as a border virtual tunneling endpoint (VTEP) device in the VxLAN domain that is configured as an RP whose network identity may be broadcast to other network devices in the VxLAN domain, and in particular, to other border VTEP devices. In certain topologies, or configurations, of the PIM-SM protocol, the virtualization provided by the VxLAN may mask certain physical network paths that can result in suboptimal SPT configurations, potentially leading to excessive network loading and reliability issues. Furthermore, when certain operations associated with the PIM-SM protocol are performed over the virtual overlay broadcast domain in some implementations of a VxLAN, network resources may be used in an undesirable manner.

According to certain implementations of this disclosure, a PIM-SM protocol over VxLAN can be optimized with an automated distributed election of RPs to designate each border VTEP device at each fabric as a local RP. The border VTEP device can be a network device that is configured to handle interfabric, or intersite, connections within the VxLAN domain. Certain implementations can better utilize intersite fabric data transfer capacity and reduce network loading. Certain implementations allow for each border VTEP device at each fabric in the VxLAN domain to act as the local RP. Certain implementations can reduce or eliminate PIM-SM encapsulation overhead. Certain implementations can provide a lightweight message-based PIM-SM synchronization that reduces overhead. Certain implementations can reference multiple PIM-SM groups respectively associated with multiple sources in a single message. Certain implementations can reduce convergence time when new PIM-SM data streams are initiated, potentially improving the end user experience with both wired and wireless networks. Certain implementations are more resilient to a single failure of a local RP and can mitigate the scope of multicast outages in the event of such a failure. Certain implementations can be used with various VxLAN fabric topologies, such as single fabric, multifabric, and shared border network devices. Certain implementations are compatible with conventional RP election methods for reverse compatibility with certain existing PIM-SM protocol implementations.

Turning now to the drawings, FIG. 1 is a depiction of a VxLAN multifabric domain 100, in an example. As noted, VxLAN is an overlay encapsulation protocol and provides a 24-bit virtual network identifier (VNID) that can be used with one or more physical networks. FIG. 1 is a schematic illustration and depicts certain network devices and connections for descriptive purposes, while other devices and connections that may exist in the underlying physical network of VxLAN multifabric domain 100 but are not included in VxLAN multifabric domain 100 are omitted for descriptive clarity with respect to the following description.

As shown in FIG. 1, VxLAN multifabric domain 100 includes three fabrics 102 that are VxLAN network segments at three different arbitrary locations, namely fabric 102-1 (fabric 1), fabric 102-2 (fabric 2), and fabric 102-3

(fabric 3), referred to generally as fabrics 102. Although three fabrics 102 are shown in FIG. 1, different numbers of fabrics can be used with VxLAN in different implementations. Furthermore, VxLAN multifabric domain 100, or specifically each of fabrics 102, are interconnected by a network 140 that can be a private network or a public network, such as the Internet, in various implementations. Network 140 can support wired connections or wireless connections or both. A management interface 142 can be accessible via network 140, in particular implementations, and can be used for configuring various network devices to operate with VxLAN multifabric domain 100. For example, management interface 142 can be used to configure network devices included with VxLAN multifabric domain 100 and can designate each respective border VTEP device 110 as a local RP.

As a VxLAN domain, network devices included in VxLAN multifabric domain 100 are configured and operate as being within one IP network domain, even though the underlying physical configuration of the network devices are distributed among multiple local networks at different locations. As a result of being configured as a single VxLAN domain, VxLAN multifabric domain 100 can be a private network that restricts access to devices and network data to entities within VxLAN multifabric domain 100, and can exclude other entities and devices from accessing VxLAN multifabric domain 100, even when the underlying physical components in VxLAN multifabric domain 100 are shared with other network segments that are not part of VxLAN multifabric domain 100.

In VxLAN multifabric domain 100, each fabric 102 includes a border VTEP device 110 that functions as an interfabric gateway (also referred to as an edge device) via network 140 to each other fabric 102. In VxLAN terminology, the interfabric connections represent VTEP connections that are referred to as tunnels, and which terminate at tunnel endpoints with border network devices, such as border VTEP devices 110. As shown in FIG. 1, fabric 102-1 includes a border VTEP device 110-1, fabric 102-2 includes a border VTEP device 110-2, and fabric 102-3 includes a border VTEP device 110-3, which may be referred to generally as VTEP devices 110 (or in the singular as VTEP device 110). A tunnel 150 in VxLAN multifabric domain 100 forms a virtual network connection between border VTEP devices 110-1 and 110-2, in one example, among other possible tunnels. Similarly, a tunnel 152 forms a virtual network connection between border VTEP devices 110-1 and 110-3, and a tunnel 154 forms a virtual network connection between border VTEP devices 110-2 and 110-3. While tunnels 150, 152, and 154 appear as direct network connections between border VTEP devices 110 that are virtual network connections, corresponding physical connections for implementing tunnels 150, 152, and 154 can be realized by connections to and from network 140, in various implementations.

The connections within individual fabrics 102 between network devices can represent intrafabric tunnels that may also represent virtual network connections associated with VxLAN multifabric domain 100. The intrafabric tunnels can accordingly be implemented using local physical connections at each fabric 102.

In the illustrated example, each fabric 102 in VxLAN multifabric domain 100 includes a route reflector (RR) network device 116 that can be used with IBGP or another similar protocol. For instance, RR network device 116 can implement IBGP at least in part by reflecting internal fabric connections at respective fabric 102 to other network devices by using a spine-leaf network topology, which may reduce or eliminate network connection loops when the network devices within respective fabric 102 are physically connected together using a mesh topology. Thus, the other network devices within fabric 102 can have single point connections to RR network device 116 and still be updated of the fabric topology to learn the connection pathways to each of the other network devices in respective fabric 102. Thus, the use of RR network device 116 can provide a potential reduction in network connections within fabric 102, such as by eliminating the mesh topology within fabrics 102, which can be desirable.

Fabrics 102 may be internally connected using the spine-leaf topology. For example, RR network device 116 can be a spine node for respective fabrics 102, while other network devices connected to RR network device 116 can be leaf nodes, other than border VTEP devices 110. In fabric 102-1, RR network device 116-1 may be a spine node, while network device 118-11, receiver DR 112, source DR 114 can be leaf nodes. In some implementations, source 122 and receiver 120 can also be leaf nodes. In fabric 102-2, network devices 118-21, 118-22, and 118-23 may be leaf nodes, while RR network device 116-2 may be a spine node. In fabric 102-3, network devices 118-31, 118-32, and 118-33 may be leaf nodes, while RR network device 116-3 may be a spine node.

As shown in FIG. 1, fabric 102-1 (fabric 1) includes an RR network device 116-1 that is connected to border VTEP device 110-1, fabric 102-2 (fabric 2) includes an RR network device 116-2 that is connected to border VTEP device 110-2, and fabric 102-3 (fabric 3) includes an RR network device 116-1 that is connected to border VTEP device 110-3. It is noted that intrafabric connections within fabrics 102 can be realized using wired connections, wireless connections, or both. Accordingly, terminal devices, or client devices, used at fabrics 102 can include various types of devices that support wired or wireless network communications, including server computers, desktop computers, personal computers, laptop computers, wireless smart phones, and tablet computers, among other types of devices.

In the illustrated example, and for example purposes, fabrics 102 are respectively depicted with multiple network devices that can perform routing functionality, among other operations. Specifically, fabric 102-2 includes network device 118-21, network device 118-22, and network device 118-23 that are directly connected to RR device 116-2; and fabric 102-3 includes network device 118-31, network device 118-32, and network device 118-33 that are directly connected to RR device 116-3. In the particular topology of VxLAN multifabric domain 100 of FIG. 1, fabric 102-1 includes both a source 122 and a receiver 120 of a PIM-SM data stream. Accordingly, in fabric 102-1, receiver 120 is connected to a receiver DR 112 while source 122 is connected to source DR 114. Fabric 102-1 also includes a network device 118-11 that can perform routing operations, among other operations.

It is noted that VxLAN multifabric domain 100 can be used to connect different network devices, at each fabric 102 with each other, or among fabrics 102, for network communications within a single logical IP domain. In various implementations, other network devices can be included and used in VxLAN multifabric domain 100.

As described above, in typical implementations of the PIM-SM protocol, one network device in a network domain can be configured as the RP, which acts as an intermediary network device for PIM-SM data streams. Also, in typical implementations of the PIM-SM protocol in a VxLAN, a border VTEP device at a first fabric is designated as the RP for the VxLAN domain, including for the other fabrics in a multifabric VxLAN domain. Thus, in a typical implementation of the PIM-SM protocol in VxLAN multifabric domain 100, for example, a border VTEP device 110-2 may be configured as the single RP.

As noted, in a typical implementation of the PIM-SM protocol, the RP may play a central role in connecting a source device (e.g., a source 122) with a receiver device (e.g., a receiver 120). Specifically, in such a typical implementation of the PIM-SM protocol, upon initiation, the PIM-SM data stream may first flow through the RP (e.g., border VTEP 110-2) and may later switch to a shortest path to source 122. Therefore, in a typical implementation of the PIM-SM protocol, a location of the RP can be significant for the overhead and network traffic involved during initiation of the PIM-SM data streaming, such as when multiple receivers 120 are located at different fabrics 102 that are remote from the RP, or when source 122 is located at a different fabric 102 from the RP.

While general guidelines for the PIM-SM protocol can recommend having the RP be located near a source device (e.g., source 122), in a typical implementation, when using VxLAN multifabric domain 100, because the physical infrastructure is abstracted using the VxLAN overlay network, it may be infeasible or impossible to keep the RP located near source 122. This difficulty may arise, as just an example, when fabrics 102 are located at different physical locations, and the actual distances between border VTEP devices 110 vary. Furthermore, because the underlying physical network used for VxLAN multifabric domain 100 can be changed, or reconfigured, during operation, potentially without affecting operation of at least certain portions of VxLAN multifabric domain 100, the actual distances between border VTEP devices 110 can change over time and result in changes of startup performance or reliability of the PIM-SM protocol, which is not desirable.

As will be described in further detail, using the PIM-SM protocol for multicasting using VxLAN multifabric domain 100 can be performed in a manner that may avoid certain performance issues that might be associated with typical implementations. For example, instead of defining one RP in VxLAN multifabric domain 100, certain implementations may include designating each respective border VTEP device 110 at each respective fabric 102 as a local RP. For example, border VTEP devices 110 may exchange PIM-SM hello messages over tunnels 150, 152, and 154, respectively, to exchange source information for respective sources at each fabric 102. In this manner, tunnels 150, 152, and 154 can form an interfabric mesh configuration.

As the local RP, each border VTEP device 110 can locally manage PIM-SM protocol communication for various receivers (e.g., receiver 120) and sources (e.g., source 122) that are co-located at fabric 102. For example, border VTEP devices 110-1 may receive one or more PIM-SM register messages from source DR 114, as indicated by a network path 156. In another example, border VTEP device 110-1 may receive PIM-SM join messages from receiver DR 112 and may forward a PIM-SM data stream to receiver DR 112, as indicated by a network path 158. In this manner, interfabric communications via tunnels between border VTEP devices 110, such as via tunnels 150, 152, and 154, typically associated with the PIM-SM protocol in certain configurations of VxLAN multifabric domain 100 may be reduced or avoided. In particular, certain interfabric communication related to PIM-SM register messages that encapsulate PIM-SM data streaming packets can be reduced or avoided, which is desirable for reducing network traffic and network loading.

Figure 2:
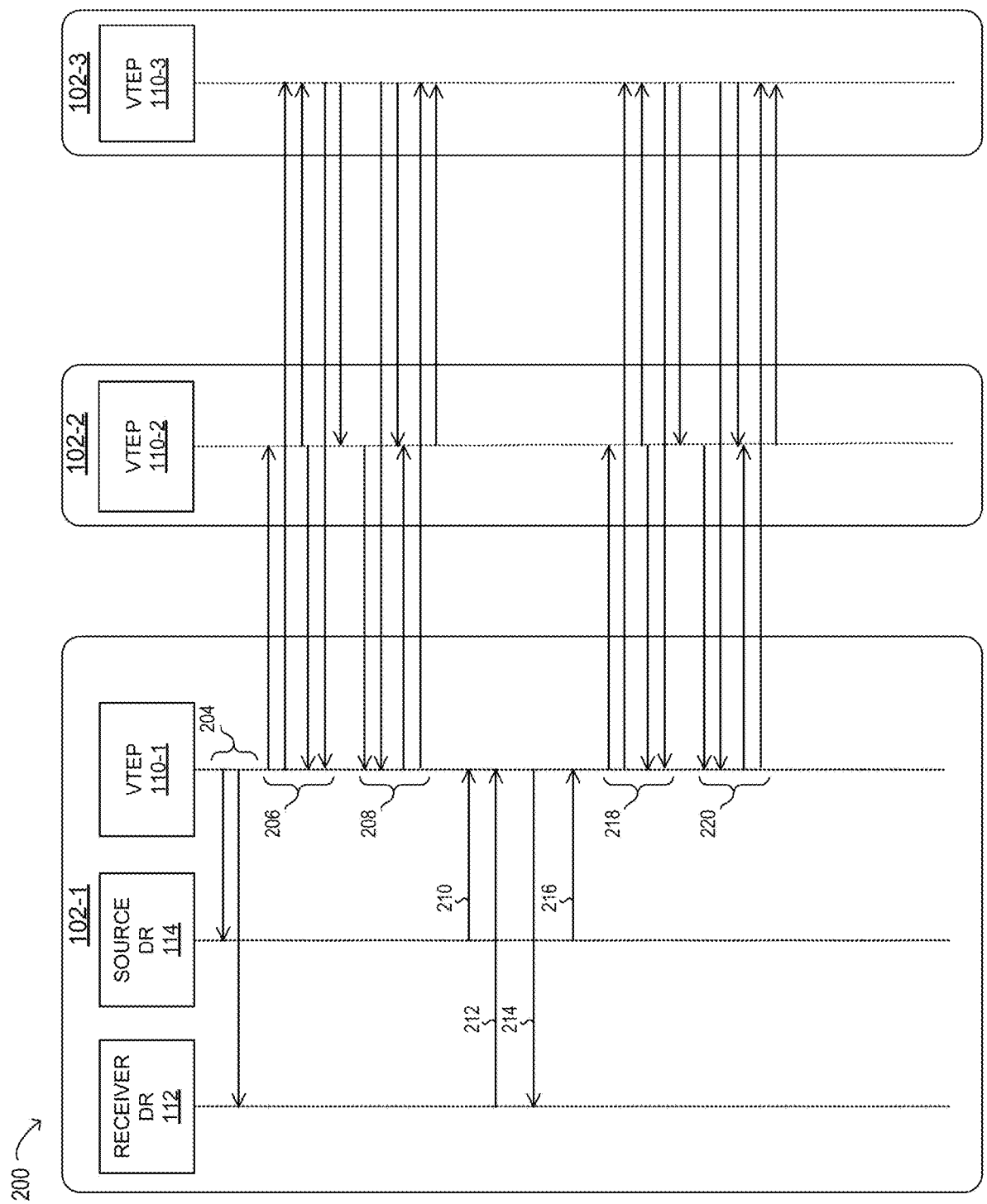
FIG. 2 is a depiction of a flow diagram, in an example.

Referring now to FIG. 2, a depiction of a flow diagram 200 is shown, in one implementation. In FIG. 2, flow diagram 200 is shown as an example timeline of actions in the form of a flow diagram that implements the methods for PIM-SM described herein. As shown, flow diagram 200 indicates a timeline going from top to bottom of the page, with messages or communications passed between fabric 102-1 (fabric 1), fabric 102-2 (fabric 2), and fabric 102-3 (fabric 3), shown as vertical lines (see FIG. 1). In fabric 102-1, internal or intrafabric messages or communications between receiver DR 112, source DR 114, and VTEP 110-1 are shown. In fabric 102-2, messages or communications with VTEP 110-2 are shown, while in fabric 102-3, messages or communications with VTEP 110-3 are shown.

In particular implementations, the timeline of actions described in flow diagram 200 can be implemented using VxLAN multifabric domain 100, as described previously. Prior to the start of flow diagram 200, it may be assumed that configuration information was received by VTEP 110-1, VTEP 110-2, and VTEP 110-3 indicating that each VTEP 110 is respectively a local RP for its respective fabric 102. For example, the configuration information may be received from management interface 142.

In flow diagram 200 shown in FIG. 2, communication in the form of commands or messages are shown in an exemplary implementation. It is noted that, along with various messages shown in flow diagram 200, certain data can also be passed or sent, such that flow diagram 200 can represent passing of messages, commands, data, parameters, handles, memory addresses, among other types of data or content. flow diagram 200 can represent a timeline going from top to bottom. However, various messages or communications depicted in flow diagram 200 may be performed in a different order than shown and described with respect to FIG. 2, in different implementations.

In FIG. 2, flow diagram 200 can begin by sending first PIM-SM hello messages 204 from VTEP 110-1 to receiver DR 112 and source DR 114, among other leaf nodes in fabric 102-1. First PIM-SM hello messages 204 may indicate that VTEP 110-1 is a local RP for fabric 102-1. VTEP 110-2 and VTEP 110-3 may send corresponding messages to PIM-SM hello messages to their respective leaf nodes.

Then, in flow diagram 200, second PIM-SM hello messages 206 are sent from each VTEP 110 to each other VTEP 110 communicating their local RP status for each fabric 102, respectively. In response, third PIM-SM hello messages 208 are received at each VTEP from each other VTEP 110 communicating their local RP status for each fabric 102, respectively.

Source DR 114 may then begin sending PIM-SM register messages 210 to VTEP 110-1 that are encapsulated in a PIM-SM data stream. Source DR 114 may continue sending PIM-SM register messages 210. VTEP 110-1 may store source and group information for source DR 114 in a routing table that can be queried, such as by receiver DR 112 for group information. VTEP 110-1 may also generate an SPT between VTEP 110-1 and source DR 114.

Receiver DR 112 may send a PIM-SM join message 212 to VTEP 110-1, such as with (*, G) state information, as a request to join the group G for receiving the PIM-SM data stream. VTEP 110-1 may generate an RPT between VTEP 110-1 and receiver DR 112. Then, VTEP 110-1 may forward PIM-SM data stream 214 to receiver DR 112. At some point, source DR 114 may begin sending PIM-SM data stream 216 to VTEP 110-1, such as in native format, while PIM-SM register messages 210 continue to be sent periodically. After a timeout period expires at VTEP 110-1 during which PIM-SM register messages 210 are no longer received, source DR 114 can be removed from the routing table, and the forwarding of PIM-SM data stream 214 may cease.

At various times or periodically, first PIM-SM control messages 218 and second PIM-SM control messages 220 can be exchanged among VTEPs 110. First PIM-SM control messages 218 and second PIM-SM control messages 220 can include information about any PIM-SM senders in a respective fabric 102. After second PIM-SM control messages 220 are received, fabrics 102 have a full mesh configuration with respect to their PIM-SM state information, such that each local RP is aware of respective PIM-SM sources in each fabric 102. In some implementations, second PIM-SM hello messages 206, third PIM-SM hello messages 208, first PIM-SM control messages 218, and second PIM-SM control messages 220 continue to be transmitted periodically to maintain the PIM-SM state information. With the full state information, each VTEP 110 can maintain information about PIM-SM sources in VxLAN domain 100 and can forward PIM-SM data streams from the PIM-SM sources in VxLAN domain 100 at any fabric 102 to a local receiver.

The example of flow diagram 200 shows how VTEP 110-1, acting as local RP for fabric 102-1, can initiate, manage, and terminate PIM-SM data streaming between local source DR 114 and local receiver DR, without intra-fabric communication, as described herein.

Figure 3A:
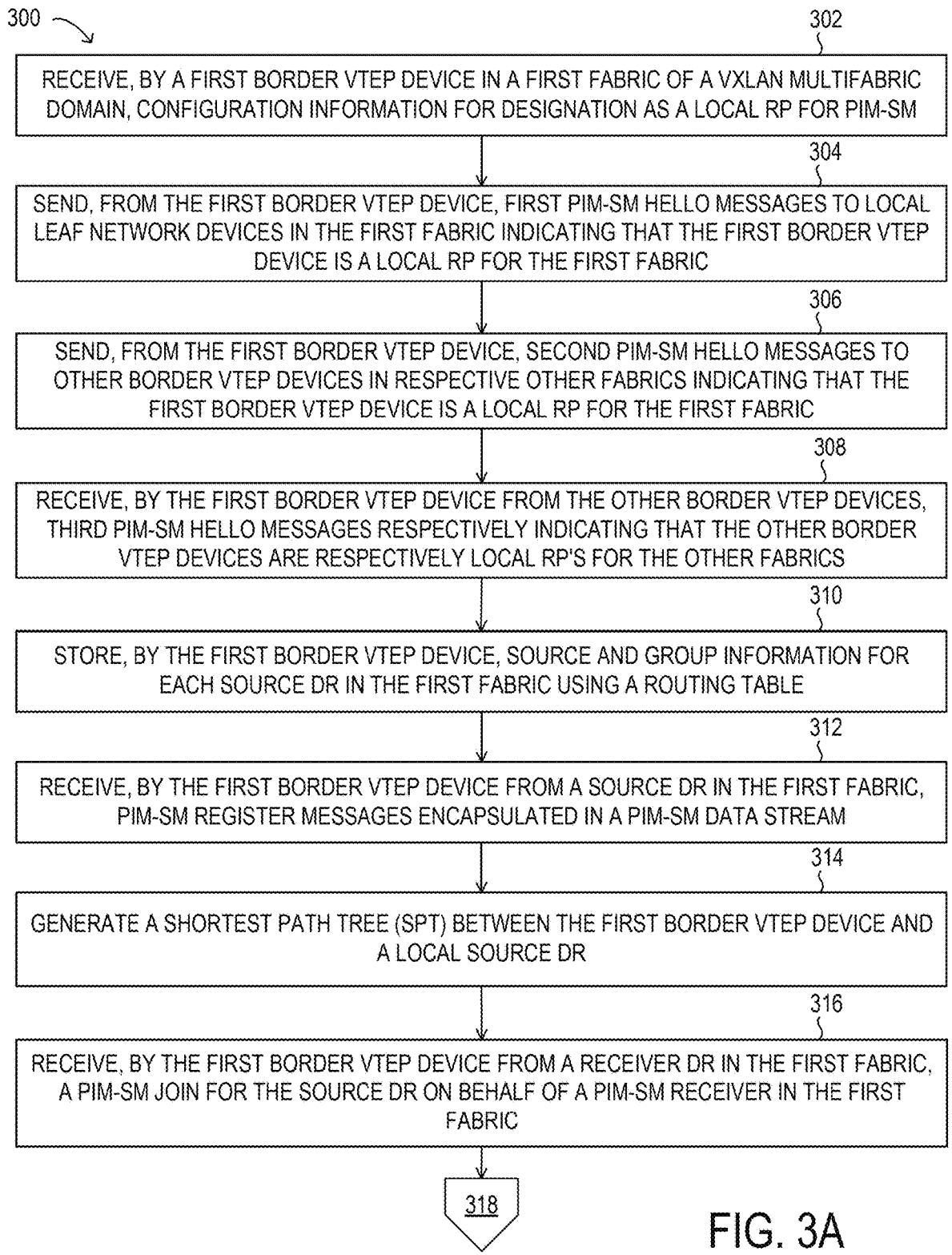
FIGS. 3A, 3B, and 3C are flowcharts depicting an example method of multicasting in a VxLAN multifabric domain, in an example.
Figure 3B:
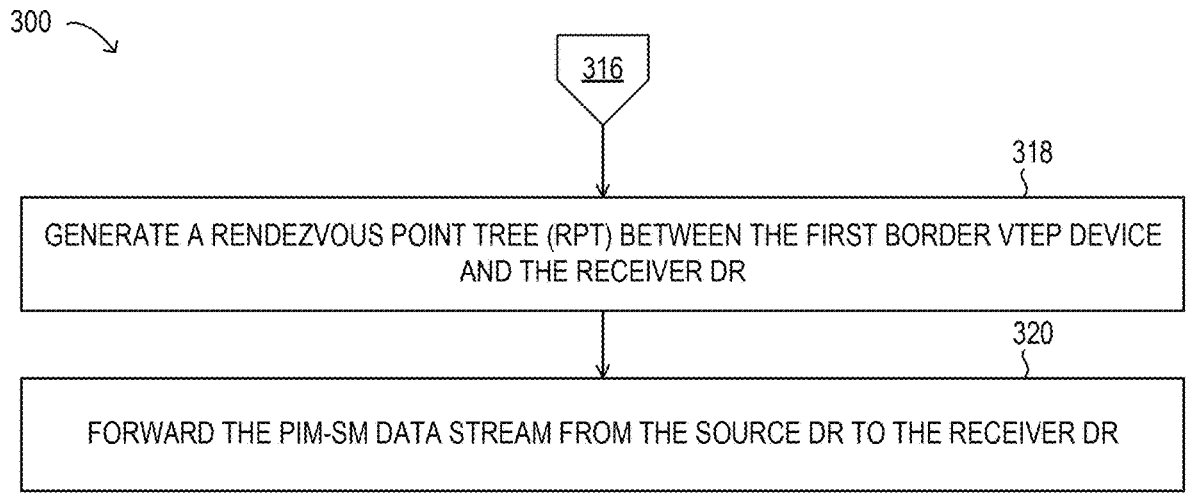
Figure 3C:
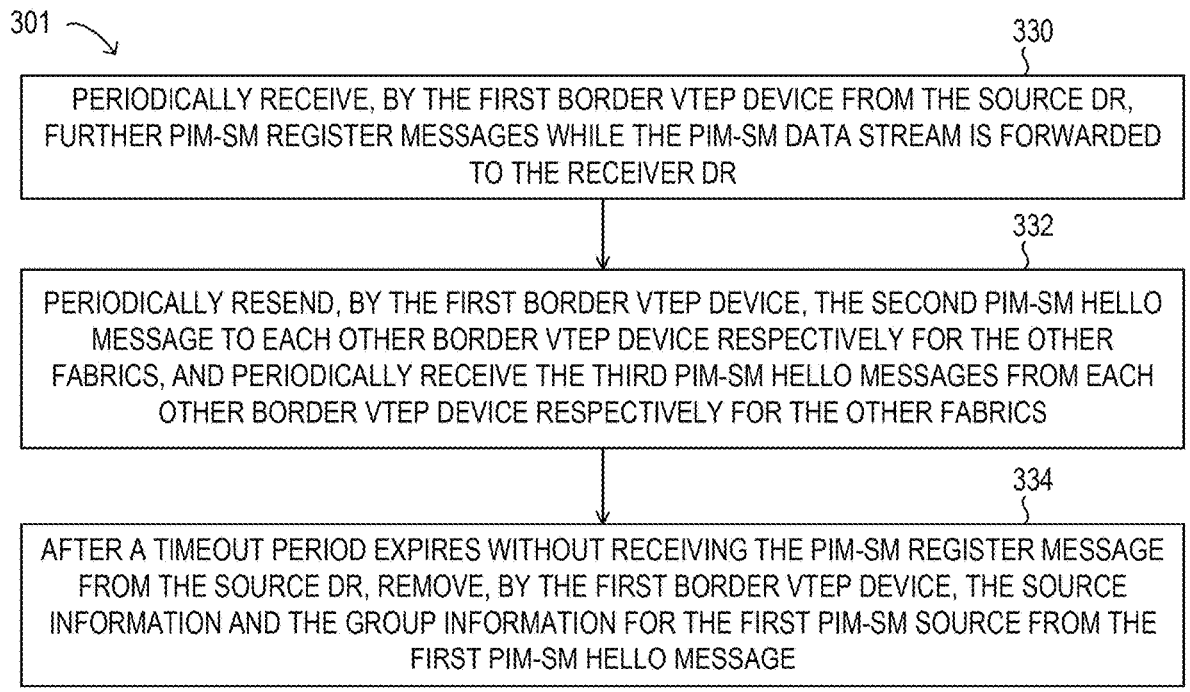

FIGS. 3A through 3C are flowcharts depicting example methods of multicasting in a VxLAN domain, in an example. In particular, FIGS. 3A and 3B are a flowchart depicting an example method 300 of multicasting in a VxLAN multifabric domain, in an example, and FIG. 3C is a flowchart depicting an example method 301 of multicasting in a VxLAN multifabric domain, in one example. Each of example methods 300 and 301 are described in greater detail below.

Addressing FIGS. 3A and 3B first, method 300 can be performed using VxLAN multifabric domain 100 of FIG. 1. In particular implementations, method 300 represents actions taken with respect to fabric 102-1 (fabric 1) by border VTEP device 110-1. Various operations in method 300 may be rearranged or omitted in different implementations.

Method 300 begins in FIG. 3A at step 302. At step 302, a first border VTEP device in a first fabric of a VxLAN multifabric domain receives configuration information for designation as a local RP for the PIM-SM protocol. In step 302, the configuration information may be received by the first border VTEP device from management interface 142. Along with the first border VTEP device, other border VTEP devices in the VxLAN multifabric domain also may be respectively designated as the local RP for PIM-SM, such as prior to, during, or after step 302.

At step 304, the first border VTEP device sends first PIM-SM hello messages to local leaf network devices in the first fabric indicating that the first border VTEP device is a local RP for the first fabric. In certain implementations, in response to step 304, the local leaf network devices may override a prior RP election that specifies a single RP in the VxLAN multifabric domain with a new RP election of the first border VTEP device as the local RP. In step 304, the local leaf network devices may be notified of the new RP election using a type-length value (TLV) field in the first PIM-SM hello message. For example, first border VTEP device 110-1 can use the TLV field in the first PIM-SM hello message to notify the local leaf network devices in fabric 102-1 that the first border VTEP device 110-1 is the local RP for fabric 102-1.

At step 306, the first border VTEP device sends second PIM-SM hello messages to other border VTEP devices in respective other fabrics indicating that the first border VTEP device is a local RP for the first fabric. For example, first border VTEP device 110-1 can use the second PIM-SM hello message to notify the other border VTEP devices that the first border VTEP device 110-1 is the local RP for fabric 102-1. At step 308, the first border VTEP device receives third PIM-SM hello messages from the other border VTEP devices indicating that the other border VTEP devices are respectively local RPs for the other fabrics. After step 308, the first border VTEP device and the other border VTEP devices may establish a mesh connection with each other. For configuring the PIM-SM protocol using VxLAN multifabric domain 100, each border VTEP device 110 can exchange the second and third PIM hello messages in steps 306 and 308 with the other border VTEP devices 110 to maintain neighbor relationships with the other RPs for the other fabrics. Thus, each border VTEP device may establish stateful connections with the other border VTEP devices resulting in a full mesh network configuration, in which each border VTEP device has a stateful connection with each other border VTEP device.

At step 310, source and group information is stored by the first border VTEP device for each source DR in the first fabric using a routing table. The first border VTEP device may perform step 310 based on its role as the local RP for the first fabric.

At step 312, the first border VTEP device receives, from a source DR in the first fabric, PIM-SM register messages encapsulated in a PIM-SM data stream. The PIM-SM register messages can include source information and group information for a PIM-SM source associated with the source DR. After step 312, until a PIM-SM join is received from the receiver DR on behalf of a PIM-SM receiver for the PIM-SM source, the PIM-SM data stream may be dropped by the first border VTEP device.

At step 314, the first border VTEP device generates an SPT between the first border VTEP device and a local source DR that is a source DR in the first fabric. The SPT may be used for forwarding the PIM-SM data stream to the receiver DR.

At step 316, the first border VTEP device receives, from a receiver DR in the first fabric, a PIM-SM join for the source DR on behalf of a PIM-SM receiver in the first fabric. The PIM-SM join may specify group information for all PIM-SM sources stored in the routing table by the first border VTEP device (e.g., (*, G) state information). For any other receiver DRs in the other fabrics in the VxLAN multifabric domain seeking to join the source DR group, respective PIM-SM joins may be received at the respective RP at each other fabric. In some implementations, the PIM-SM join in step 316 can specify the PIM-SM source (e.g., (S,G) state information).

Method 300 continues with step 318 in FIG. 3B. At step 318, an RPT is generated between the first border VTEP device and the receiver DR. For any other receiver DRs in the other fabrics in the VxLAN multifabric domain sending PIM joins, respective RPTs in the other fabrics can also be generated. At step 320, the PIM data stream is forwarded from the source DR to the receiver DR.

Turning to FIG. 3C, method 301 can be performed using VxLAN multifabric domain 100 of FIG. 1. In particular implementations, method 301 represents actions taken with respect to fabric 102-1 by border VTEP device 110-1. Various operations in method 301 may be rearranged or omitted in different implementations.

Method 301 may represent ongoing operations while the PIM data stream is forwarded from the source DR to the receiver DR after method 300 ends. At step 330, further PIM-SM register messages are periodically received, by the first border VTEP device from the source DR, while the PIM-SM data stream is forwarded to the receiver DR. The periodic receipt of the PIM-SM register messages from the source DR may maintain an active condition for the PIM-SM data stream, such that the first VTEP device continues to forward the PIM-SM data stream to the receiver DR.

At step 332, the second PIM-SM hello message are periodically resent, by the first border VTEP device, to each other border VTEP device respectively for the other fabrics, and the third PIM-SM hello messages from each other border VTEP device are periodically received, respectively, for the other fabrics. The exchange of the PIM-SM hello messages among the border VTEP devices in the VxLAN multifabric domain may maintain the stateful connections that each border VTEP device has with each other border VTEP device.

After a timeout period expires without receiving the PIM-SM register message from the source DR, at step 334, the source information and the group information for the first PIM-SM source are removed, by the first border VTEP device, from the first PIM-SM hello message. Step 334 may result in the other border VTEP devices being updated by removing indications of the first PIM-SM source from their respective state information when the source DR stops forwarding the PIM-SM data stream.

Figure 4:
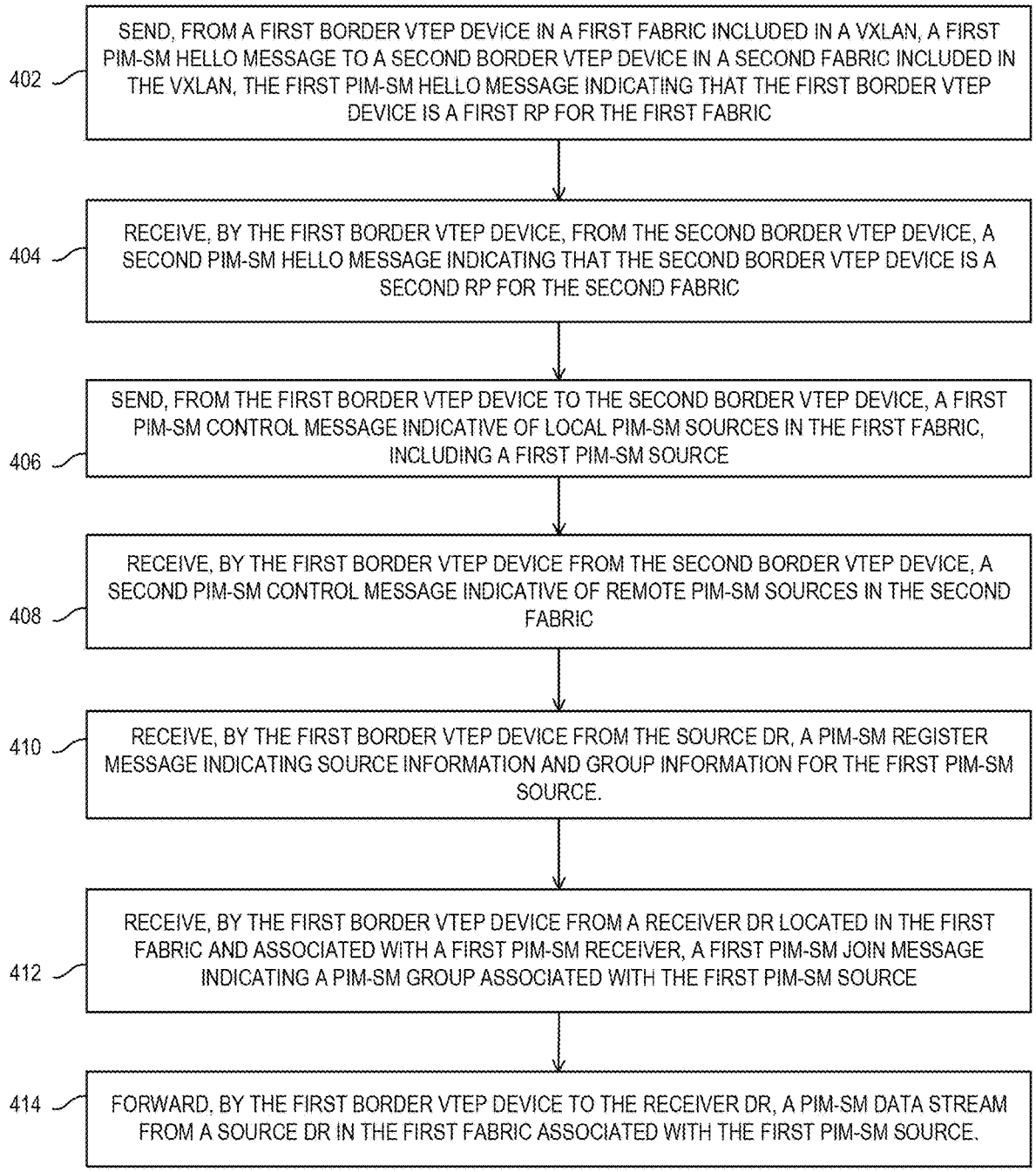
FIG. 4 is a flowchart depicting an example method of multicasting in a VxLAN multifabric domain, in an example.

FIG. 4 is a flowchart of an example method 400 of multicasting in a VxLAN multifabric domain, in one example. Method 400 can be performed using VxLAN multifabric domain 100. In particular implementations, method 400 represents actions taken with respect to fabric 102-1 by border VTEP device 110-1. Various operations in method 400 may be rearranged or omitted in different implementations.

Method 400 begins at step 402. At step 402, a first PIM-SM hello message is sent, from a first border VTEP device in a first fabric included in a VxLAN, to a second border VTEP device in a second fabric included in the VXLAN, the first PIM-SM hello message indicating that the first border VTEP device is a first RP for the first fabric. In some implementations at step 402, a first border VTEP device in a first fabric included in a VxLAN having multiple fabrics, may send a first PIM-SM hello message to each other border VTEP device respectively for the multiple fabrics, the first PIM-SM hello message indicating that the first border VTEP device is a first RP for the first fabric. The first PIM-SM hello message can be sent using any one of tunnels 150 or 152 in an example implementation using VxLAN multifabric domain 100. Prior to sending the first PIM-SM hello message in step 402, the first border VTEP device can communicate its status as local RP to local leaf network devices in the first fabric, such as by sending local PIM-SM hello messages to the local leaf network devices. Upon receiving the local PIM hello messages, the local leaf network devices may update, or override, any previous RP election information, if present, with a new election of the first border VTEP device as the local RP for the first fabric.

At step 404, a second PIM-SM hello message indicating that the second border VTEP device is a second RP for the second fabric is received, by the first border VTEP device, from the second border VTEP device. In some implementations of step 404, multiple second PIM-SM hello messages respectively indicating that each other border VTEP device is respectively a second RP for each of the multiple fabrics may be received by the first border VTEP device, from each other border VTEP device. The second PIM-SM hello message can be received using one of tunnels 150 or 152, in an example implementation using VxLAN multifabric domain 100. The sending and receiving of the first hello message and the second PIM hello message in steps 402 and 404 can represent an exchange of group and source information between the first border VTEP device and the second border VTEP device in the VxLAN multifabric domain.

Each border VTEP device in the VxLAN multifabric domain may respectively perform steps 402 and 404, including establishing a full mesh configuration comprising stateful connections between each pair of the border VTEP devices.

At step 406, a first PIM-SM control message indicative of local PIM-SM sources in the first fabric, including a first PIM-SM source is sent, from the first border VTEP device to the second border VTEP device. In some implementations of step 406, first PIM-SM control message may be sent, from the first border VTEP device, to each other border VTEP device, the first PIM-SM control message including information indicative of PIM-SM sources in the first fabric, including a first PIM-SM source. When multiple PIM sources are present in the first fabric, the multiple PIM-SM sources can be included in the information in the first PIM-SM control message. The first PIM-SM control message can be sent using one of tunnels 150 or 152 in an example implementation using VxLAN multifabric domain 100.

At step 408, a second PIM-SM control message indicative of remote PIM-SM sources in the second fabric is received, by the first border VTEP device from the second border VTEP device. In some implementations of step 408, multiple second PIM-SM control messages including respective information indicative of PIM sources in each of the multiple fabrics may be received by the first border VTEP device from each other border VTEP device. After step 408, the border VTEP devices in the first fabric and in the second fabric may have updated source and group information for the VxLAN domain. The second PIM-SM control messages can be received using one of tunnels 150 or 152, in an example implementation using VxLAN multifabric domain 100.

At step 410, a PIM-SM register message indicating source information and group information for the first PIM-SM source is received by the first border VTEP device from the source DR. The PIM-SM register message can be received using network path 156 in an example implementation using VxLAN multifabric domain 100. In certain implementations of method 400, step 410 may be rearranged or may be performed prior to method 400.

At step 412, a first PIM-SM join message indicating a PIM-SM group associated with the first PIM-SM source is received, by the first border VTEP device from a receiver DR located in the first fabric and associated with a first PIM-SM receiver. The PIM-SM join message can be received using network path 158 in an example implementation using VxLAN multifabric domain 100. At step 414, a PIM-SM data stream is forwarded, by the first border VTEP device, from a source DR in the first fabric associated with the first PIM-SM source to the receiver DR. The PIM-SM data stream can be forwarded using network paths 156 and 158 in an example implementation using VxLAN multifabric domain 100.

Figure 5:
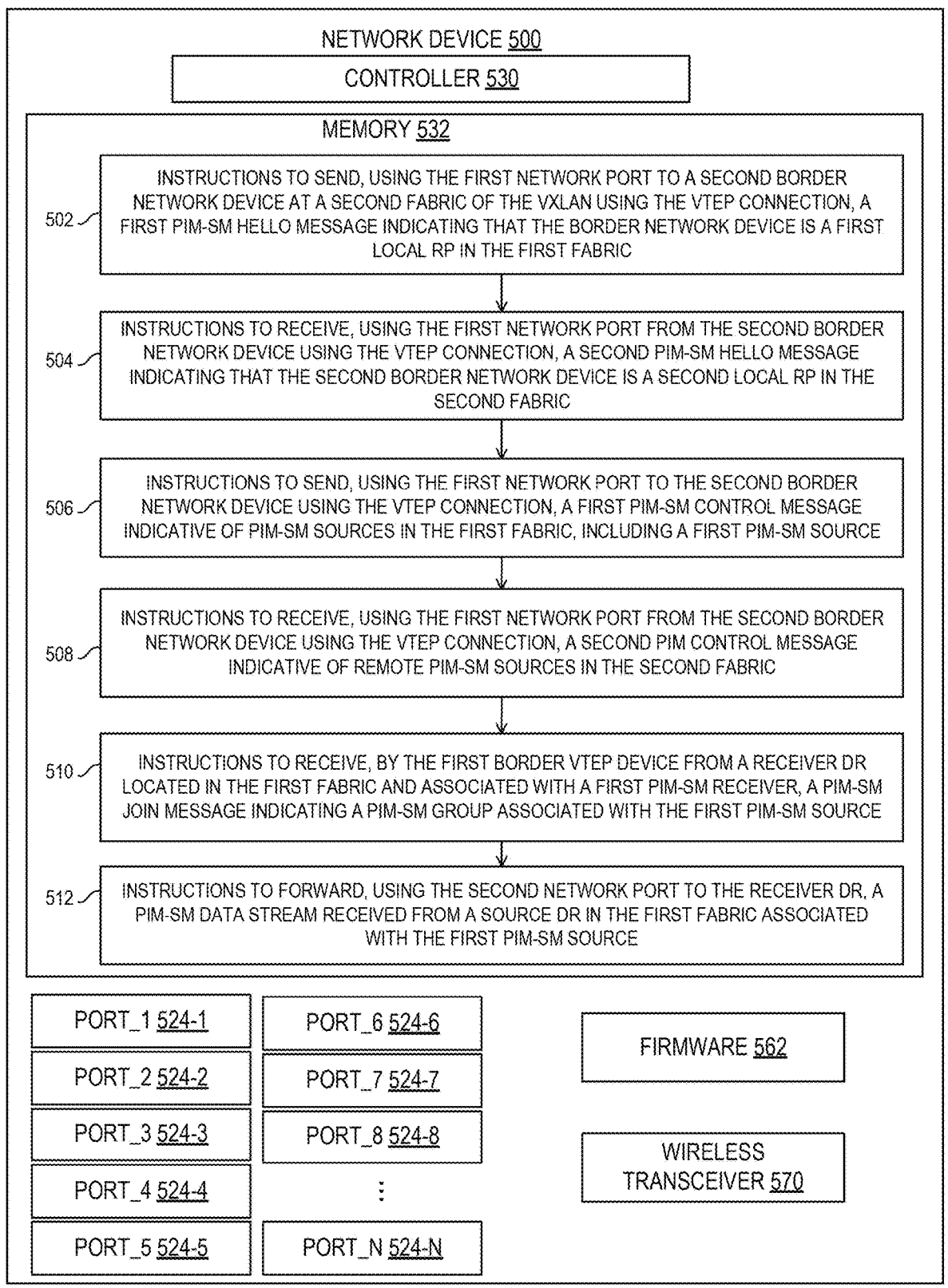
FIG. 5 is a depiction of a network device, in an example.

FIG. 5 is a depiction of a network device 500, in an example. Network device 500 can represent any of the network devices shown in VxLAN multifabric domain 100 in FIG. 1. For example, network device 500 could represent border VTEP device 110, RR network device 116, receiver DR 112, source DR, network device 118, receiver 120, and/or source 122 of FIG. 1. FIG. 5 is a schematic illustration that depicts certain elements and data included with network device 500 without limitation.

As shown in FIG. 5, network device 500 includes a controller 530 having access to a memory 532 and a firmware 562 . . . . Firmware 252 can represent any of a variety of instructions or code that can be executable by controller 530. Although described as firmware, firmware 562 could be firmware and/or software in various implementations. Controller 530 can represent processing functionality of network device 500, such as by including a microprocessor, a field-programmable gate array (FPGA), or another processing element. For example, firmware 562 or instructions stored in memory 532 can include executable code to perform various methods and operations for multicasting in a VxLAN multifabric domain, such as by implementing a PIM-SM protocol according to the methods and operations described herein.

Network device 500 also includes multiple network ports 524 that can represent certain types of wired communication interfaces. As just one particular example, one or more of network ports 524 could be interfaces that support Ethernet, such as with an RJ-45 interface. Network device 500 can include up to N network ports 524, shown as port 524-N (port_N), and in particular as port 524-1 (port_1), port 524-2 (port_2), port 524-3 (port_3), port 524-4 (port_4), port 524-5 (port_5), port 524-6 (port_6), port 524-7 (port_7), and port 524-8 (port_8). For example, using network ports 524, network device 500 can perform routing or switching or both in a network.

In the illustrated example, network device 500 is shown including a wireless transceiver 570 that may support one or more wireless communication channels, such as for wireless networking according to an interface standard, such as a WiFi protocol based on an IEEE 802.11 standard, among others. Network device 500 may also perform routing or switching or both using wireless transceiver 570 in some implementations. In particular implementations, wireless transceiver 570 may be optional or may be omitted, such as when wired network connections are used.

For example, when network data in the form of data packets is received using network ports 524 or wireless transceiver 570, controller 530 can parse the contents of the data packets, such as certain data fields within the data packets, to determine how to route or switch the data packet. Furthermore, memory 532, or another storage included with network device 500, can be used by controller 530 to store information associated with the routing or switching, such as storing identities of other network devices associated with the PIM-SM protocol, or storing tables of network devices arranged in a certain network topology with respect to network device 500. In this manner, network device 500 can retain knowledge of other network devices in the network and the network topology of how those network devices are connected to each other, such as to facilitate communication with the other network devices using network ports 524 or wireless transceiver 570.

In operation, network device 500 can implement various functionality for multicasting for multifabric virtual networks described herein. In particular, network device 500 can implement method 300 and/or method 400, such as by using instructions stored in memory 532 or by firmware 562. For example, memory 532 or firmware 562 or both can store instructions, such as shown stored by memory 532 and described in further detail below. Such instructions stored in memory 532 or by firmware 562 can be executed by controller 530. In various implementations, network ports 524 can be used to forward/receive network packets to/from other network devices for purposes of implementing methods 300 and/or method 400, among other operations described herein. The network packets forwarded using network ports 524 can include PIM-SM-register messages, PIM-SM hello messages, PIM-SM joins, PIM-SM control messages, and PIM-SM data streams, among other types of communications including further messages or network packets associated with the PIM-SM protocol.

In FIG. 5, memory 532 may include a non-transitory computer-readable medium that stores programming for execution by controller 530. In some implementations, controller 530 can represent one or more controllers or one or more processing devices. In this implementation, one or more modules within network device 500 may be partially or wholly embodied as software for performing any functionality described in this disclosure.

For example, memory 532 may include instructions 502 to send, using the first network port to a second border network device at a second fabric of the VxLAN using the VTEP connection, a first PIM-SM hello message indicating that the border network device is a first local RP in the first fabric. Memory 532 may include instructions 504 to receive, using the first network port from the second border network device using the VTEP connection, a second PIM-SM hello message indicating that the second border network device is a second local RP in the second fabric.

Memory 532 may include instructions 506 to send, using the first network port to the second border network device using the VTEP connection, a first PIM-SM control message indicative of PIM-SM sources in the first fabric, including a first PIM-SM source. Memory 532 may include instructions 508 to receive, using the first network port from the second border network device using the VTEP connection, a second PIM control message indicative of remote PIM-SM sources in the second fabric. Memory 532 may include instructions 510 to receive, using the second network port from a receiver DR located in the first fabric and associated with a first PIM-SM receiver, a PIM-SM join message indicating a PIM-SM group associated with the first PIM-SM source. Memory 532 may include instructions 512 to forward, using the second network port to the receiver DR, a PIM-SM data stream received from a source DR in the first fabric associated with the first PIM-SM source.

Certain implementations of the systems, methods, and operations disclosed herein of multicast for multifabric virtualized networks may provide none, some, or all of the following technical advantages. Certain implementations can better utilize and reduce overconsumption of interfabric network capacity. Certain implementations allow for border VTEP devices to assume the role of RP for each respective local fabric as a default condition that can reduce administrative overhead for RP election and can reduce errors associated with RP election methods, such as for the PIM-SM protocol. Certain implementations can override a prior RP election for a VxLAN multifabric domain with a new election of border VTEP devices serving as local RPs for each respective fabric.

Certain implementations provide for low overhead synchronization of PIM-SM data streams that avoids overhead associated with PIM-SM registration using packets encapsulated with streaming data, which may be beneficial for either software-based or in-hardware implemented methods of registration. Certain implementations utilize basic PIM data streaming information, such as a source identifier and a group IP address, that is sufficient for synchronization of PIM-SM data streams and can be implemented using a single packet exchange and does not rely on forwarding data stream packets. Certain implementations provide for reduced overhead both in cases of establishing a PIM-SM data stream as well as stopping the PIM-SM data stream, such as when a source DR stops streaming data, also referred to as flow expiry.

Certain implementations can embed source information for multiple sources without increasing overhead, such as by using a single packet for multiple source groups, which can reduce network traffic and packets involved with intersite synchronization. Certain implementations can reduce convergence time for establishing new PIM-SM data streams since each local RP is aware of registered PIM-SM sources in the fabric. Certain implementations provide improved robustness to failures or errors at a single fabric without affecting other PIM-SM data streams at other fabrics that are ongoing, due to the decentralization from using respective local RPs, instead of one RP for the entire VxLAN multifabric domain. Certain implementations can be used in various network contexts and topologies, such as single fabric, multifabric without shared borders, and multifabric with shared borders without interoperability problems. As disclosed herein, in certain implementations, a border VTEP device sends, to a second border VTEP devices, a first PIM-SM hello message indicating the border VTEP device is a local RP in a first fabric of a VxLAN. The border VTEP device receives a second PIM-SM hello message indicating that the second border VTEP devices is a local RP in a second fabric. A first PIM-SM control message is sent to the second border VTEP device, indicating PIM-SM sources in the first fabric, including a first PIM-SM source. A second PIM-SM control message is received from the second border VTEP device indicating PIM-SM sources in the second fabric. A PIM-SM join message specifying the first PIM-SM source is received from a receiver DR for a PIM-SM receiver. A PIM-SM data stream is forwarded from a source DR to the receiver DR.

The foregoing outlines features of several examples so that those skilled in the art may better understand the aspects of the present disclosure. Various modifications and combinations of the illustrative examples, as well as other examples, are contemplated in the description.

What is claimed is:

1. A method, comprising:
    sending, from a first border virtual tunneling endpoint (VTEP) device in a first fabric included in a virtual extensible local area network (VxLAN), a first protocol independent multicast sparse mode (PIM-SM) hello message to a second border VTEP device in a second fabric included in the VxLAN, the first PIM-SM hello message indicating that the first border VTEP device is a first rendezvous point (RP) for the first fabric;
    receiving, by the first border VTEP device from the second border VTEP device, a second PIM-SM hello message indicating that the second border VTEP device is a second RP for the second fabric;
    sending, from the first border VTEP device to the second border VTEP device, a first PIM-SM control message indicative of local PIM-SM sources in the first fabric, including a first PIM-SM source;
    receiving, by the first border VTEP device from the second border VTEP device, a second PIM-SM control message indicative of remote PIM-SM sources in the second fabric;
    receiving, by the first border VTEP device from a receiver designated router (DR) located in the first fabric and associated with a first PIM-SM receiver, a first PIM-SM join message indicating a PIM-SM group associated with the first PIM-SM source; and
    forwarding, by the first border VTEP device to the receiver DR, a PIM-SM data stream from a source DR in the first fabric associated with the first PIM-SM source.

2. The method of claim 1, wherein, in response to receiving the first PIM-SM join message from the receiver DR, the method further comprises:
    creating a rendezvous point tree (RPT) between the first border VTEP device and the receiver DR; and
    forwarding the PIM-SM data stream to the receiver DR using the RPT.

3. The method of claim 1, further comprising:
    receiving, by the first border VTEP device from the source DR, a PIM-SM register message indicating source information and group information for the first PIM-SM source.

4. The method of claim 3, wherein receiving the PIM-SM register message further comprises:
    periodically receiving the PIM-SM register message while the PIM-SM data stream is forwarded to the receiver DR.

5. The method of claim 4, further comprising:
    periodically resending the first PIM-SM hello message to the second border VTEP device; and
    periodically receiving the second PIM-SM hello messages from the second border VTEP device.

6. The method of claim 5, further comprising:
    after a timeout period expires without receiving the PIM-SM register message from the source DR, removing the source information and the group information for the first PIM-SM source from the first PIM-SM hello message.

7. The method of claim 1, further comprising:
    sending, from the first border VTEP device to at least one network device at the first fabric, a third PIM-SM hello message indicating that the first border VTEP device is the first RP for the first fabric.

8. A border network device, comprising:
    a first network port for respectively establishing a virtual tunneling endpoint (VTEP) connection in a virtual extensible local area network (VxLAN);
    a second network port for connecting to a first fabric of the VxLAN;
    a memory; and
    a controller having access to the first network port and the second network port and to the memory, the memory storing instructions executable by the controller to:
        send, using the first network port to a second border network device at a second fabric of the VxLAN using the VTEP connection, a first protocol independent multicast sparse mode (PIM-SM) hello message indicating that the border network device is a first local rendezvous point (RP) in the first fabric;

receive, using the first network port from the second border network device using the VTEP connection, a second PIM-SM hello message indicating that the second border network device is a second local RP in the second fabric;

send, using the first network port to the second border network device using the VTEP connection, a first PIM-SM control message indicative of PIM-SM sources in the first fabric, including a first PIM-SM source;

receive, using the first network port from the second border network device using the VTEP connection, a second PIM control message indicative of remote PIM-SM sources in the second fabric;

receive, using the second network port from a receiver designated router (DR) located in the first fabric and associated with a first PIM-SM receiver, a PIM-SM join message indicating a PIM-SM group associated with the first PIM-SM source; and forward, using the second network port to the receiver DR, a PIM-SM data stream received from a source DR in the first fabric associated with the first PIM-SM source.

9. The border network device of claim 8, further comprising instructions to:

in response to the PIM-SM join message from the receiver DR, create a rendezvous point tree (RPT) between the border network device and the receiver DR; and forward the PIM-SM data stream using the RPT.

10. The border network device of claim 8, further comprising instructions to:

receive, using the second network port from the source DR, a PIM-SM register message indicating source information and group information for the first PIM-SM source.

11. The border network device of claim 10, wherein the instructions to receive the PIM-SM register message further comprise instructions to:

periodically receive the PIM-SM register message while the PIM-SM data stream is forwarded to the receiver DR.

12. The border network device of claim 11, further comprising instructions to:

periodically resend the first PIM-SM hello message to the second border network device; and periodically receive the second PIM-SM hello message from the second border network device.

13. The border network device of claim 12, further comprising instructions to:

after a timeout period expires without receiving the PIM-SM register message from the source DR, remove an indication of the first PIM-SM source from the first PIM-SM hello message.

14. The border network device of claim 8, further comprising instructions to:

sending, to at least one network device at the first fabric, a third PIM-SM hello message indicating that the first border network device is the first RP for the first fabric.

15. Non-transitory computer-readable media storing programming for execution by one or more processors, the programming comprising instructions to:

send, from a first border virtual tunneling endpoint (VTEP) device in a first fabric included in a virtual extensible local area network (VxLAN), to a second border VTEP device in a second fabric in the VxLAN, a first protocol independent multicast sparse mode (PIM-SM) hello message indicating that the first border VTEP device is a first rendezvous point (RP) for the first fabric;

receive, by the first border VTEP device from the second border VTEP device, a second PIM-SM hello message indicating that the second border VTEP devices is a second RP for the second fabric;

send, from the first border VTEP device to the second border VTEP device, a first PIM-SM control message indicative of PIM-SM sources in the first fabric, including a first PIM-SM source;

receive, by the first border VTEP device from the second border VTEP device, a second PIM-SM control message indicative of PIM-SM sources in the second fabric;

receive, by the first border VTEP device from a receiver designated router (DR) in the first fabric and associated with a first PIM-SM receiver, a PIM-SM join message indicating a PIM-SM group associated with the first PIM-SM source; and forward, by the first border VTEP device from a source DR associated with the first PIM-SM source, a PIM-SM data stream to the receiver DR.

16. The non-transitory computer-readable media of claim 15, further comprising instructions to:

in response to the PIM-SM join message from the receiver DR, create a rendezvous point tree (RPT) between the first border VTEP device and the receiver DR; and forward the PIM-SM data stream using the RPT.

17. The non-transitory computer-readable media of claim 15, further comprising instructions to:

receive, from the source DR, a PIM-SM register message indicating source information and group information for the first PIM-SM source.

18. The non-transitory computer-readable media of claim 17, wherein the instructions to receive the PIM-SM register message further comprise instructions to:

periodically receive the PIM-SM register message while the PIM-SM data stream is forwarded to the receiver DR.

19. The non-transitory computer-readable media of claim 18, further comprising instructions to:

periodically resend the first PIM-SM hello message to the second border VTEP device; and periodically receive the second PIM-SM hello message from the second border VTEP device.

20. The non-transitory computer-readable media of claim 19, further comprising instructions to:

after a timeout period expires without receiving the PIM-SM register message from the source DR, remove an indication of the first PIM-SM source from the first PIM-SM hello message.

* * * * *